US011281581B2

(12) United States Patent
Lee

(10) Patent No.: US 11,281,581 B2
(45) Date of Patent: Mar. 22, 2022

(54) MEMORY SYSTEM

(71) Applicant: SK hynix Inc., Icheon (KR)

(72) Inventor: Kyung Soo Lee, Icheon (KR)

(73) Assignee: SK hynix Inc., Icheon (KR)

(*) Notice: Subject to any disclaimer, the term of this patent is extended or adjusted under 35 U.S.C. 154(b) by 0 days.

(21) Appl. No.: 17/010,551

(22) Filed: Sep. 2, 2020

(65) Prior Publication Data

US 2021/0326261 A1  Oct. 21, 2021

(30) Foreign Application Priority Data

Apr. 16, 2020 (KR) .................. 10-2020-0045735

(51) Int. Cl.
*G06F 12/08* (2016.01)
*G06F 12/0811* (2016.01)
*G06F 12/0891* (2016.01)
*G06F 12/0888* (2016.01)

(52) U.S. Cl.
CPC ...... *G06F 12/0811* (2013.01); *G06F 12/0888* (2013.01); *G06F 12/0891* (2013.01); *G06F 2212/1024* (2013.01)

(58) Field of Classification Search
None
See application file for complete search history.

(56) References Cited

U.S. PATENT DOCUMENTS

| 5,822,762 | A  | * | 10/1998 | Nishida | G06F 12/0888 |
| | | | | | 711/139 |
| 8,341,353 | B2 | * | 12/2012 | Venkumahanti | G06F 12/0884 |
| | | | | | 711/122 |
| 2008/0022051 | A1 | * | 1/2008 | Osanai | G06F 12/0897 |
| | | | | | 711/138 |
| 2013/0346696 | A1 | * | 12/2013 | Park | G06F 12/0846 |
| | | | | | 711/122 |
| 2014/0082410 | A1 | * | 3/2014 | Ziakas | G06F 3/0683 |
| | | | | | 714/6.2 |
| 2016/0267008 | A1 | * | 9/2016 | Takeda | G06F 12/0246 |
| 2018/0181494 | A1 | * | 6/2018 | Malladi | G06F 12/0897 |
| 2018/0336143 | A1 | * | 11/2018 | Lai | G06F 12/128 |
| 2019/0163252 | A1 | * | 5/2019 | Phoenix | G06F 12/0804 |
| 2020/0117601 | A1 | * | 4/2020 | Kaneda | G06F 3/06 |
| 2020/0242032 | A1 | * | 7/2020 | Lin | G06F 12/0811 |

FOREIGN PATENT DOCUMENTS

| KR | 101502998 B1 | 3/2015 |
| KR | 20160098973 A | 8/2016 |

* cited by examiner

*Primary Examiner* — Kaushikkumar M Patel

(57) ABSTRACT

A memory system includes: a first cache; a second cache; and a control unit configured to access the first cache as a first level cache in a first cache mode of operation of the memory system and access the second cache as the first level cache in a second cache mode of operation of the memory system.

19 Claims, 13 Drawing Sheets

MEMORY SYSTEM

CROSS-REFERENCES TO RELATED APPLICATION

The present application claims priority under 35 U.S.C. § 119(a) to Korean application number 10-2020-0045735, filed on Apr. 16, 2020, in the Korean Intellectual Property Office, which is incorporated herein by reference in its entirety.

BACKGROUND

1. Technical Field

Various embodiments generally relate to a memory system, and more particularly, to a memory system including a memory apparatus.

2. Related Art

A memory system may be configured to store data provided from a host device, in response to a write request received from the host device. Furthermore, the memory system may be configured to provide the host device with the stored data, in response to a read request received from the host device. The host device is an electronic device capable of processing data and may include a computer, a digital camera, a cellular phone and so on. The memory system may be embedded in the host device, or may be a separate system from the host device and operate via electrical connections to the host device.

SUMMARY

In some embodiments, a memory system having improved efficiency of cache management, by minimizing data movement between multilevel caches, is described herein.

In an embodiment, a memory system may include: a first cache; a second cache; and a control unit configured to access the first cache as a first level cache in a first cache mode of operation of the memory system and access the second cache as the first level cache in a second cache mode of operation of the memory system.

In an embodiment, a memory system may include: a first cache; a second cache; and a cache mode manager configured to select a first cache mode, which uses the first cache as a first level cache, or a second cache mode, which uses the second cache as the first level cache, as a current cache mode based on a hit count for the first cache and a hit count for the second cache.

In an embodiment, a memory system may include: a first cache; a second cache; and a control unit configured to evict data from the first cache to the second cache according to a first cache eviction policy when the memory system operates in a first cache mode; and evict data from the second cache to the first cache according to a second cache eviction policy when the memory system operates in a second cache mode.

According to the memory system in accordance with the embodiments, it is possible to efficiently perform cache management by minimizing data movement between multilevel caches.

DETAILED DESCRIPTION

Figure 1:
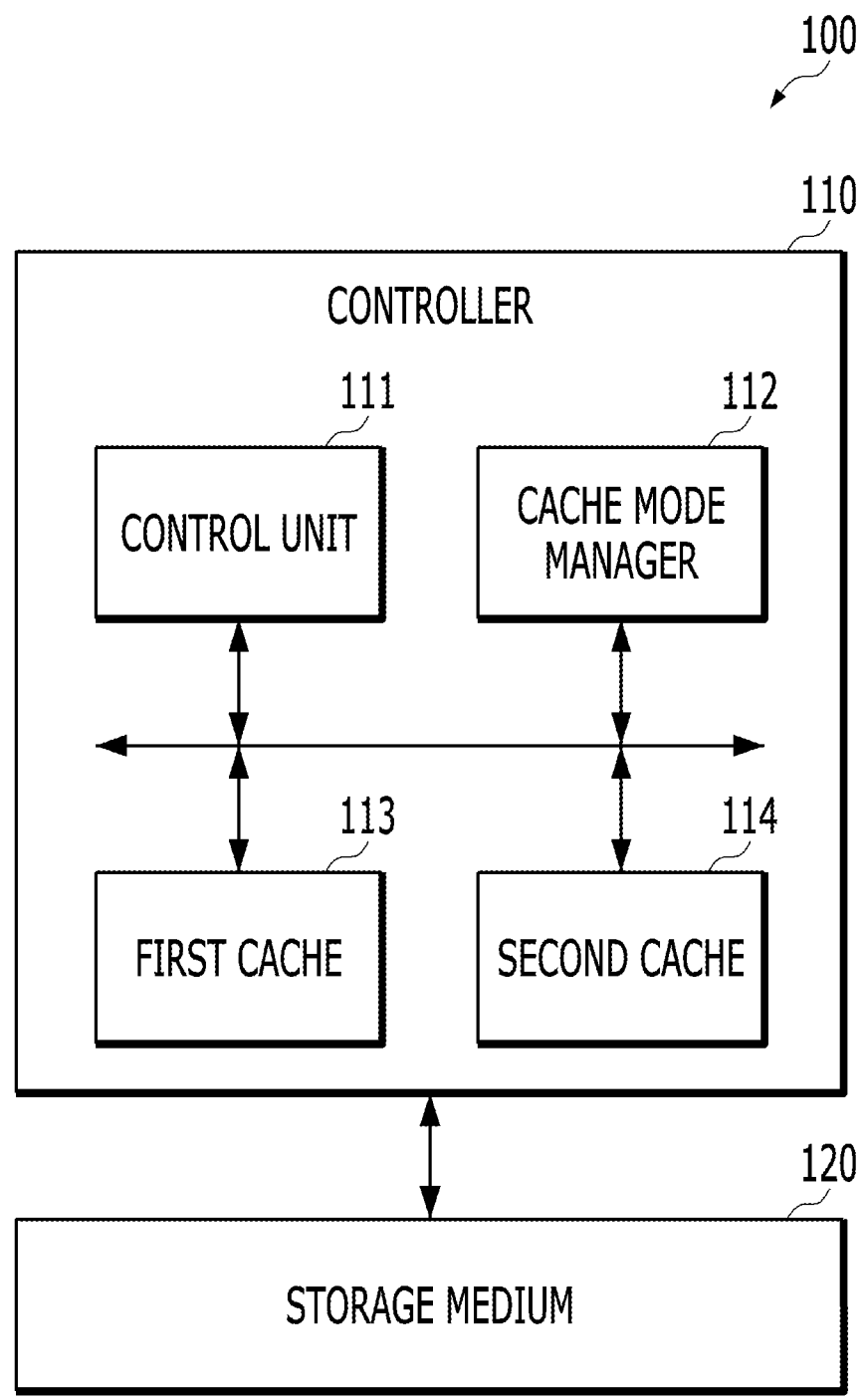
FIG. 1 is a block diagram illustrating a memory system in accordance with an embodiment.

In the present disclosure, advantages, features and methods for achieving them will become more apparent after a reading of the following exemplary embodiments taken in conjunction with the drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily enforce the technical concept of the present disclosure.

It is to be understood herein that embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, embodiments of the present disclosure will be described in detail with reference to the drawings.

FIG. 1 is a block diagram illustrating a memory system 100 in accordance with an embodiment.

Referring to FIG. 1, the memory system 100 may be configured to store data provided from an external host device in response to a write request received from the host device. Furthermore, the memory system 100 may be configured to provide the host device with stored data in response to receiving a read request from the host device.

The memory system 100 may include a personal computer memory card international association (PCMCIA) card, a compact flash (CF) card, a smart media card, a memory stick, various multimedia cards such as MultiMediaCard (MMC), eMMC (embedded MMC), RS-MMC (reduced size MMC), and MMC-micro, a secure digital (SD) card such as SD, Mini-SD, and Micro-SD, a universal flash storage (UFS), a solid state drive (SSD) and so on.

The memory system 100 may include a controller 110 and a storage medium 120. In an embodiment, the controller 110 is a digital circuit that manages the flow of data going to and from the data storage medium 120. The controller may be formed on a chip independently or integrated with one or more other circuits.

The controller 110 may control overall operations of the memory system 100. The controller 110 may control the storage medium 120 in order to perform a foreground operation according to an instruction received from the host device. The foreground operation may include an operation of writing data in or to the storage medium 120 and reading the data from the storage medium 120 according to the instruction requested by the host device (e.g., a write request and/or a read request).

Furthermore, the controller 110 may control the storage medium 120 in order to perform an internally required background operation independent of any instructions requested by the host device. The background operation may include at least one of a wear leveling operation, a garbage collection operation, an erase operation, a read reclaim operation, and a refresh operation for the storage medium 120. The background operation may include an operation of writing data in or to the storage medium 120 and reading the data from the storage medium 120, similar to the foreground operation.

The controller 110 may include a control unit 111, a cache mode manager 112, a first cache 113, and a second cache 114.

The control unit 111 may control overall operations of the controller 110. In order to process the write request and/or the read request requested by the host device, the control unit 111 may access the first cache 113 and the second cache 114 according to a current cache mode. In accordance with an embodiment, in order to reduce cache management overhead by minimizing data movement between the first cache 113 and the second cache 114, a first level cache of the first cache 113 and the second cache 114 may be changed according to a cache mode.

Specifically, in a first cache mode, the first level cache may be the first cache 113 and a second level cache may be the second cache 114. Accordingly, in the first cache mode, the control unit 111 may access the first cache 113 before the second cache 114.

On the other hand, in a second cache mode, the first level cache may be the second cache 114 and the second level cache may be the first cache 113. Accordingly, in the second cache mode, the control unit 111 may access the second cache 114 before the first cache 113.

The cache mode manager 112 may select the first cache mode or the second cache mode as the current cache mode based on a hit count of or associated with the first cache 113 and a hit count of or associated with the second cache 114. A hit count may be, for example, a number or amount of cache hits for a cache (over a certain time period), where a cache hit occurs when data or a file is requested from the cache and the cache is able to provide the requested data or file.

When a subtraction value obtained by subtracting the hit count of the first cache 113 from the hit count of the second cache 114 exceeds a count threshold (e.g., a minimum number of cache hits), the cache mode manager 112 may select the second cache mode, and when the subtraction value does not exceed the count threshold, the cache mode manager 112 may select the first cache mode. The cache mode manager 112 may inform the control unit 111 of the selected current cache mode.

The first cache 113 and the second cache 114 may cache data read from the storage medium 120 and data to be stored in the storage medium 120.

The first cache 113 and the second cache 114 may operate at a faster access speed than the storage medium 120.

The first cache 113 may operate at a faster access speed than the second cache 114.

The second cache 114 may have a larger memory capacity than the first cache 113.

Each of the first cache 113 and the second cache 114 may include a volatile memory apparatus. The volatile memory apparatus may include a dynamic random access memory (DRAM), a static random access memory (SRAM) and so on.

Each of the first cache 113 and the second cache 114 may include a nonvolatile memory apparatus. The nonvolatile memory apparatus may include a flash memory apparatus such as a NAND flash and a NOR flash, a ferroelectric random access memory (FeRAM), a phase-change random access memory (PCRAM), a magnetic random access memory (MRAM), a resistive random access memory (ReRAM) and so on.

The storage medium 120 may store data transmitted from the controller 110, read the stored data, and/or transmit the read data to the controller 110, under the control of the controller 110.

The storage medium 120 may have a larger memory capacity than the first cache 113 and the second cache 114.

The storage medium 120 may include a flash memory apparatus such as a NAND flash and a NOR flash, a ferroelectric random access memory (FeRAM), a phase-change random access memory (PCRAM), a magnetic random access memory (MRAM), a resistive random access memory (ReRAM) and so on.

The storage medium 120 may include one or more planes, one or more memory chips, one or more memory dies, and/or one or more memory packages.

Figure 2A:
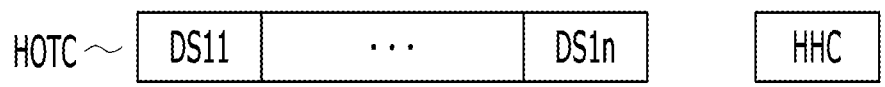
FIG. 2A and FIG. 2B are diagrams illustrating a method in which a cache mode manager of FIG. 1 performs a cache mode selection operation in accordance with an embodiment.
Figure 2A:
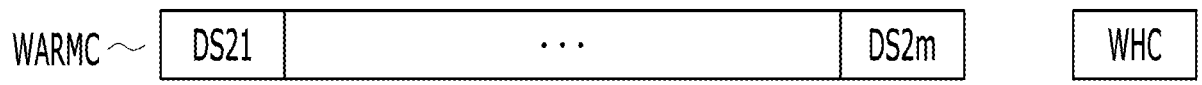
Figure 2B:
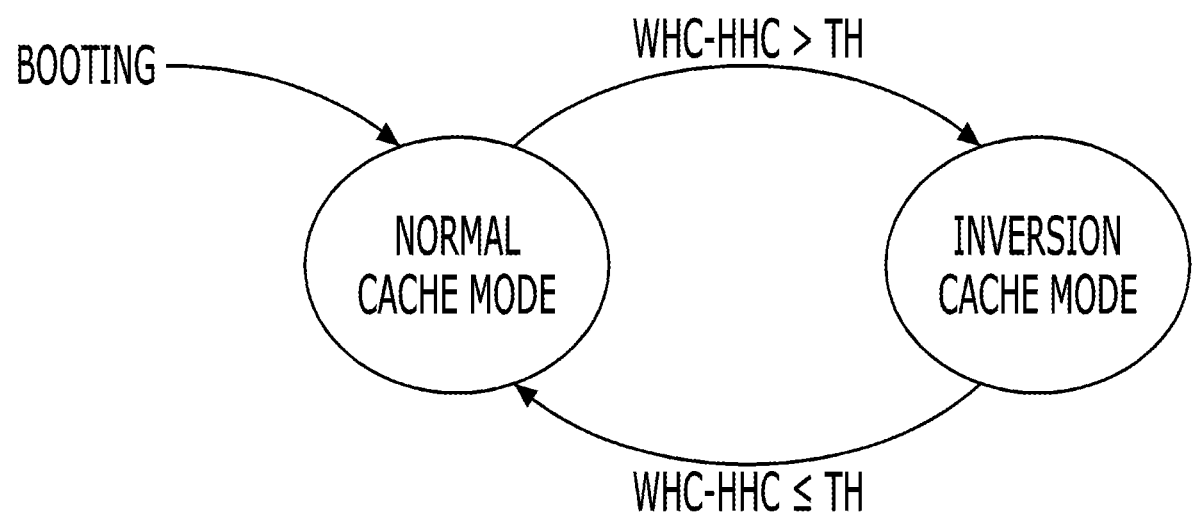

FIG. 2A and FIG. 2B are diagrams illustrating a method in which the cache mode manager 112 of FIG. 1 performs a cache mode selection operation in accordance with an embodiment. Hereinafter, the first cache 113 of FIG. 1 may be a hot cache HOTC and the second cache 114 may be a warm cache WARMC. Furthermore, the first cache mode may be called a normal cache mode and the second cache mode may be called an inversion cache mode.

Referring to FIG. 2A, the hot cache HOTC may store data segments DS11 to DS1$n$. The warm cache WARMC may have a larger memory capacity than the hot cache HOTC and store data segments DS21 to DS2m. The data segment may be a unit in which data is stored in and evicted from the hot cache HOTC and the warm cache WARMC.

The cache mode manager 112 may increase a hit count HHC of the hot cache HOTC whenever the data segments DS11 to DS1n of the hot cache HOTC are cache hit. Furthermore, the cache mode manager 112 may increase a hit count WHC of the warm cache WARMC whenever the data segments DS21 to DS2m of the warm cache WARMC are cache hit.

Referring to FIG. 2B, at boot time, the cache mode may be set as the normal cache mode. Alternatively, at boot time, the cache mode manager 112 may select the cache mode as the normal cache mode. Accordingly, after booting, the hot cache HOTC may be used as the first level cache and the warm cache WARMC may be used as the second level cache.

Furthermore, the cache mode manager 112 may perform the cache mode selection operation in real-time or periodically. In accordance with an embodiment, the cache mode manager 112 may determine whether to perform the cache mode selection operation based on the number of cache misses, a cache miss rate, and/or a cache hit ratio for the current first level cache. For example, the cache mode manager 112 may determine to perform the cache mode selection operation when the number of cache misses or the cache miss rate for the current first level cache exceeds a miss threshold number and/or is below a certain threshold rate or threshold ratio.

The cache mode selection operation may include a step of comparing a value (e.g., a subtraction value) obtained by subtracting the hit count HHC of the hot cache HOTC from the hit count WHC of the warm cache WARMC with a count threshold TH, and a step of selecting or determining the current cache mode according to or based on the comparison result.

Specifically, when the subtraction value exceeds the count threshold TH in the normal cache mode (e.g., WHC−HHC>TH), the cache mode manager 112 may change the current cache mode to the inversion cache mode. When the subtraction value exceeds the count threshold TH in the inversion cache mode, the cache mode manager 112 may continue to maintain the inversion cache mode. In the inversion cache mode, the warm cache WARMC may be used as the first level cache and the hot cache HOTC may be used as the second level cache.

Furthermore, when the subtraction value does not exceed the count threshold TH in the inversion cache mode (e.g., WHC−HHC≤TH), the cache mode manager 112 may change the current cache mode to the normal cache mode. When the subtraction value does not exceed the count threshold TH in the normal cache mode, the cache mode manager 112 may continue to maintain the normal cache mode.

Thus, the current cache mode may operate having the hot cache HOTC or the warm cache WARMC as the first level cache. As a result, the cache miss rate may be lowered or improved, reducing data movement between the hot cache HOTC and the warm cache WARMC, resulting in an improved or enhanced operational performance of the memory system 100.

Figure 3:
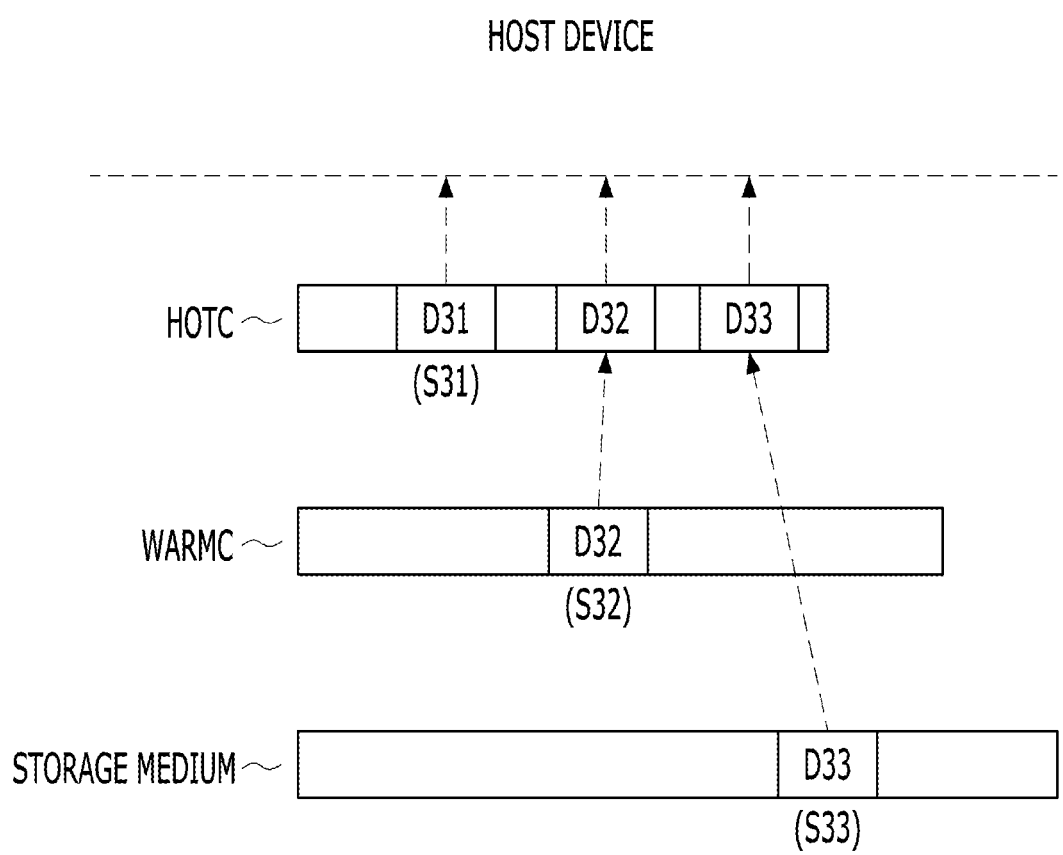
FIG. 3 is a diagram illustrating a method of accessing a hot cache and a warm cache in a normal cache mode in accordance with an embodiment.

FIG. 3 is a diagram illustrating a method of accessing the hot cache HOTC and the warm cache WARMC in the normal cache mode in accordance with an embodiment.

Referring to FIG. 3, in the normal cache mode, the hot cache HOTC may be the first level cache and the warm cache WARMC may be the second level cache.

In situation S31, the control unit 111 may first determine whether a cache hit occurs in the hot cache HOTC in response to an access request received from the host device. When the cache hit occurs in the hot cache HOTC, the control unit 111 may access the hot cache HOTC. For example, when the access request of the host device is a read request, the control unit 111 may transmit data D31 from the hot cache HOTC to the host device. Meanwhile, the cache mode manager 112 may increase the hit count HHC of the hot cache HOTC because the cache hit occurred with respect to the hot cache HOTC.

In situation S32, the control unit 111 may determine that a cache hit occurs in the warm cache WARMC when a cache miss occurs in the hot cache HOTC in response to an access request received from the host device. When the cache hit occurs in the warm cache WARMC, the control unit 111 may recover data D32 from the warm cache WARMC to the hot cache HOTC and access the hot cache HOTC. For example, when the access request of the host device is a read request, the control unit 111 may transmit the data D32 from the hot cache HOTC to the host device. At this time, the data D32 in the warm cache WARMC may be deleted. Meanwhile, the cache mode manager 112 may increase the hit count WHC of the warm cache WARMC because the cache hit occurred with respect to the warm cache WARMC.

In situation S33, the control unit 111 may recover data from the storage medium 120 to the hot cache HOTC when cache misses occur with respect to the hot cache HOTC and the warm cache WARMC in response to an access request received from the host device, and access the hot cache HOTC. For example, when the access request of the host device is a read request, the control unit 111 may transmit data D33 from the hot cache HOTC to the host device. Meanwhile, the cache mode manager 112 may not increase the hit count HHC of the hot cache HOTC or the hit count WHC of the warm cache WARMC because no cache hit occurred for either the hot cache HOTC or the warm cache WARMC.

Similar to operations in response to read requests, the control unit 111 may receive a write request from the host device and similarly access the hot cache HOTC and the warm cache when responding to the write request in the normal cache mode. However, when a cache hit occurs in the hot cache HOTC, the control unit 111 may store write data in a position where corresponding or associated data (for example, the data D31) has been stored in the hot cache HOTC. Furthermore, the control unit 111 may store write data in a position where data recovered to the hot cache HOTC (for example, the data D32 or the data D33) has been stored.

Figure 4:
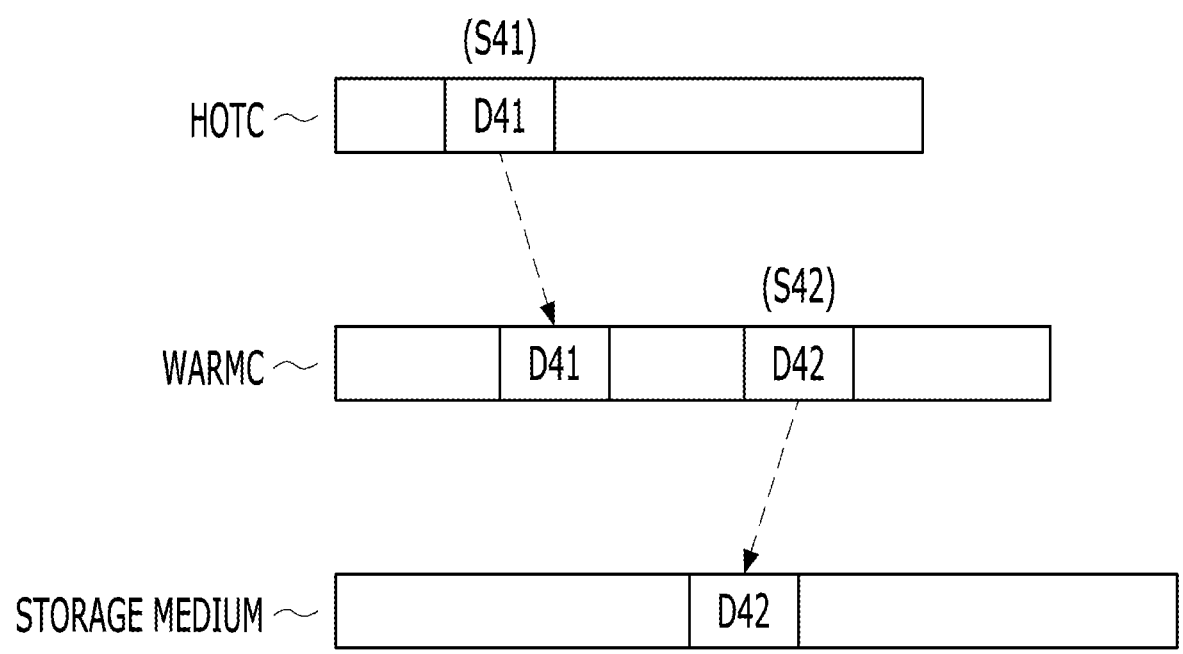
FIG. 4 is a diagram illustrating a method of evicting data from the hot cache and the warm cache in the normal cache mode in accordance with an embodiment.

FIG. 4 is a diagram illustrating a method of evicting data from the hot cache HOTC and the warm cache WARMC in the normal cache mode in accordance with an embodiment.

Referring to FIG. 4, in situation S41, when there is no more data storage space in the hot cache HOTC, the control unit 111 may evict data D41 from the hot cache HOTC to the warm cache WARMC. For example, the control unit 111 may evict the data D41 before data recovered from the warm cache WARMC or the storage medium 120 is stored in the hot cache HOTC. At this time, the control unit 111 may select or determine the data D41 to be evicted from the hot cache HOTC according to or following a first cache eviction policy. The first cache eviction policy may be a least recently used (LRU) policy. For example, the control unit 111 may determine the least frequently accessed data D41 as data to be evicted from the hot cache HOTC, based on the LRU policy.

In situation S42, when there is no more data storage space in the warm cache WARMC, the control unit 111 may evict data D42 from the warm cache WARMC to the storage medium 120. For example, the control unit 111 may evict the data D42 before data evicted from the hot cache HOTC is stored in or to the warm cache WARMC. At this time, the control unit 111 may select or determine the data D42 to be evicted from the warm cache WARMC according to or following the first cache eviction policy. That is, the control unit 111 may determine the least frequently accessed data D42 as data to be evicted from the warm cache WARMC, based on the LRU policy.

Figure 5:
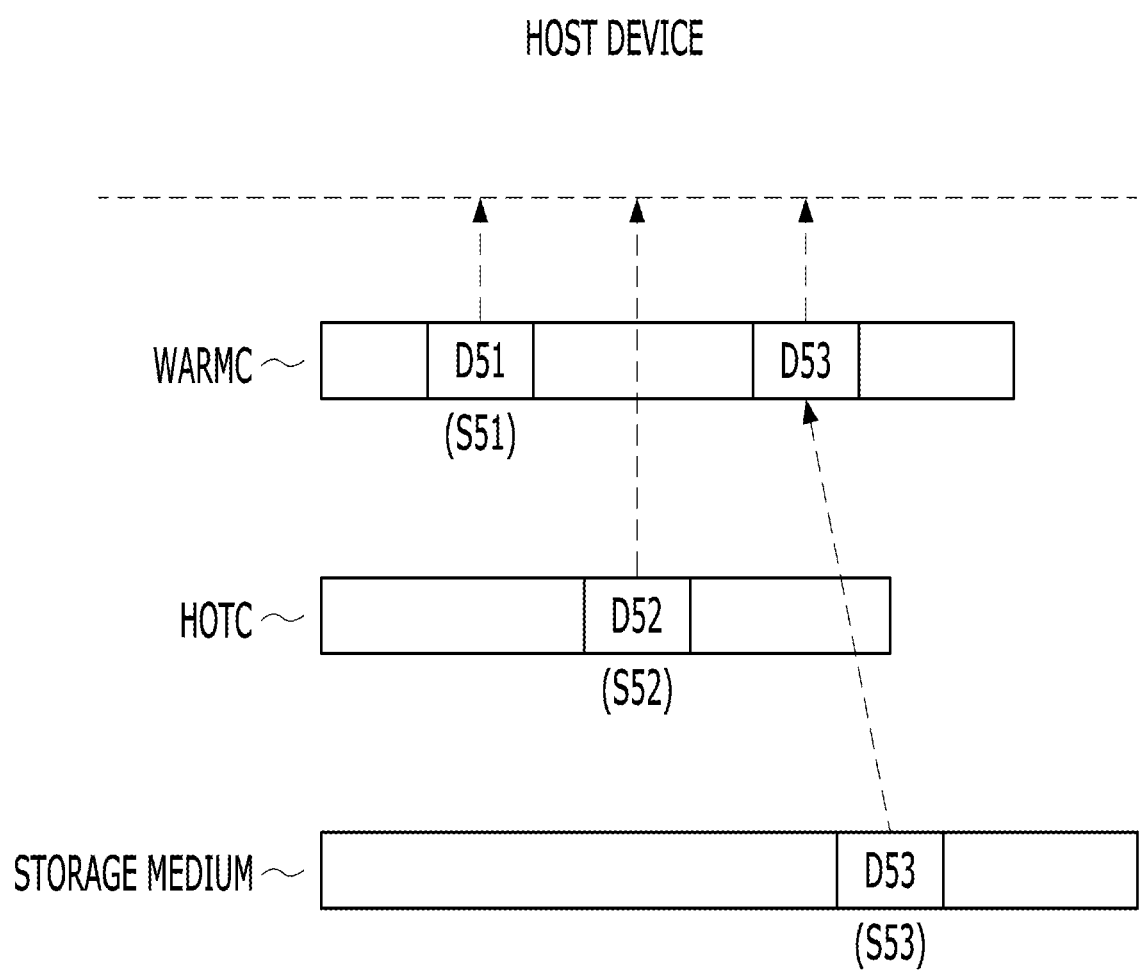
FIG. 5 is a diagram illustrating a method of accessing the warm cache and the hot cache in an inversion cache mode in accordance with an embodiment.

FIG. 5 is a diagram illustrating a method of accessing the hot cache HOTC and the warm cache WARMC in the inversion cache mode in accordance with an embodiment.

Referring to FIG. 5, in the inversion cache mode, the warm cache WARMC may be the first level cache and the hot cache HOTC may be the second level cache. In the inversion cache mode, data recovery may be more efficiently performed than in the normal cache mode based on the characteristics of the hot cache HOTC and the warm cache WARMC.

Specifically, in situation S51, the control unit 111 may first determine whether a cache hit occurs in or associated with the warm cache WARMC in response to an access request received from the host device. When the cache hit occurs in the warm cache WARMC, the control unit 111 may access the warm cache WARMC. For example, when the access request of the host device is a read request, the control unit 111 may transmit data D51 from the warm cache WARMC to the host device. Meanwhile, the cache mode manager 112 may increase the hit count WHC of the warm cache WARMC because the cache hit has occurred for the warm cache WARMC.

In situation S52, the control unit 111 may determine that a cache hit occurs in the hot cache HOTC when a cache miss occurs in the warm cache WARMC, in response to an access request of the host device. When the cache hit occurs in the hot cache HOTC, the control unit 111 may access the hot cache HOTC. For example, when the access request of the host device is a read request, the control unit 111 may transmit data D52 from the hot cache HOTC to the host device. Thus, because the hot cache HOTC has a faster access speed than the warm cache WARMC, the data D52 is not moved from the hot cache HOTC to the warm cache WARMC and may be directly transmitted from the hot cache HOTC to the host device. Meanwhile, the cache mode manager 112 may increase the hit count HHC of the hot cache HOTC because the cache hit has occurred for the hot cache HOTC.

In situation S53, the control unit 111 may recover data D53 from the storage medium 120 to the warm cache WARMC when cache misses occur in the warm cache WARMC and the hot cache HOTC in response to an access request of the host device, and access the warm cache WARMC. For example, when the access request of the host device is a read request, the control unit 111 may transmit the data D53 from the warm cache WARMC to the host device. Meanwhile, the cache mode manager 112 may not increase the hit count HHC of the hot cache HOTC or the hit count WHC of the warm cache WARMC because no cache hit occurred for either the hot cache HOTC or the warm cache WARMC.

Similar to operations in response to read requests, the control unit 111 may receive a write request from the host device and similarly access the hot cache HOTC and the warm cache when responding to the write request in the inversion cache mode. However, when a cache hit occurs in the warm cache WARMC, the control unit 111 may store write data in a position where corresponding data (for example, the data D51) has been stored in the warm cache WARMC. Furthermore, when a cache hit occurs in the hot cache HOTC, the control unit 111 may store write data in a position where corresponding data (for example, the data D52) has been stored in the hot cache HOTC. Furthermore, the control unit 111 may store write data in a position where data recovered to the warm cache WARMC (for example, the data D53) has been stored.

Figure 6:
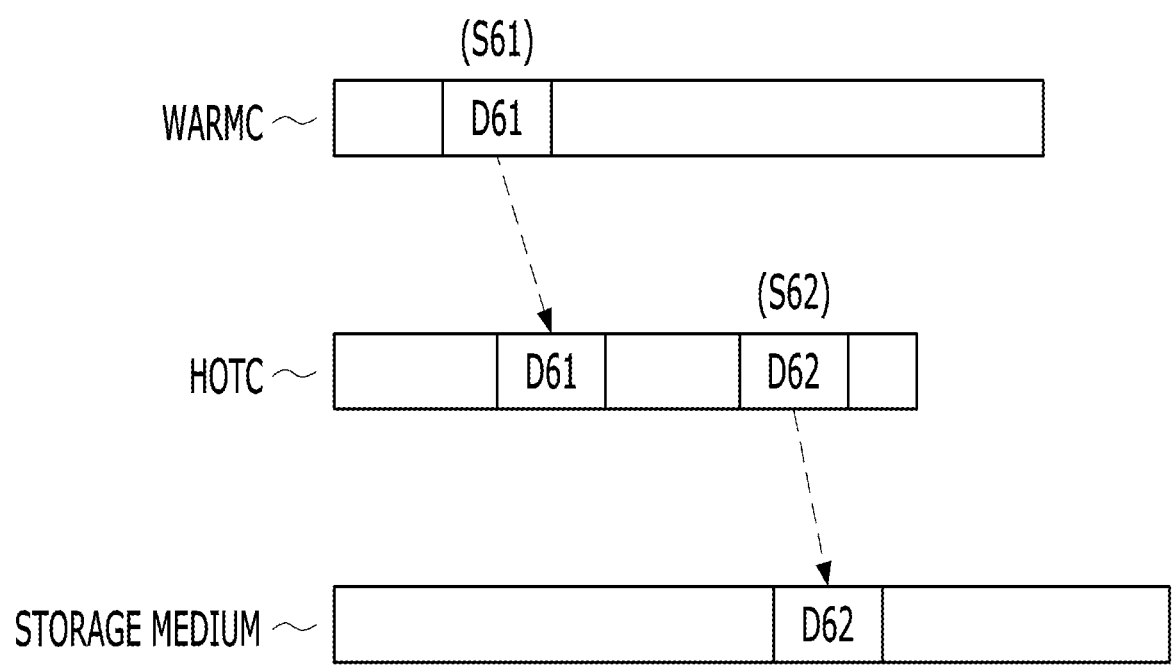
FIG. 6 is a diagram illustrating a method of evicting data from the warm cache and the hot cache in the inversion cache mode in accordance with an embodiment.

FIG. 6 is a diagram illustrating a method of evicting data from the warm cache WARMC and the hot cache HOTC in the inversion cache mode in accordance with an embodiment.

Referring to FIG. 6, in the inversion cache mode, data eviction may be more efficiently performed than in the normal cache mode based on the characteristics of the hot cache HOTC and the warm cache WARMC.

In situation S61, when there is no more data storage space in the warm cache WARMC, the control unit 111 may evict data D61 from the warm cache WARMC to the hot cache HOTC. For example, the control unit 111 may evict the data D61 before data recovered from the storage medium 120 is stored in or to the warm cache WARMC. At this time, the control unit 111 may determine the data D61 to be evicted from the warm cache WARMC according to or based on a second cache eviction policy. The second cache eviction policy may be a most recently used (MRU) policy. That is, the control unit 111 may determine the most frequently accessed data D61 as data to be evicted from the warm cache WARMC.

In situation S62, when there is no more data storage space in the hot cache HOTC, the control unit 111 may evict data D62 from the hot cache HOTC to the storage medium 120. For example, the control unit 111 may evict the data D62 before data evicted from the warm cache WARMC is stored in or to the hot cache HOTC. At this time, the control unit 111 may determine the data D62 to be evicted from the hot cache HOTC according to or based on the first cache eviction policy. That is, the control unit 111 may determine the least frequently accessed data D62 as data to be evicted from the hot cache HOTC, based on the LRU policy.

In accordance with an embodiment, the memory system 100 may further include one or more additional caches at a lower level than the hot cache HOTC and the warm cache WARMC. In such a case, for both the normal cache mode and the inversion cache mode, when cache misses occur in the first level cache and the second level cache, it may be sequentially determined whether cache hits occur in the additional caches. Furthermore, for both the normal cache mode and the inversion cache mode, each of the additional caches may store data evicted from upper caches.

Figure 7:
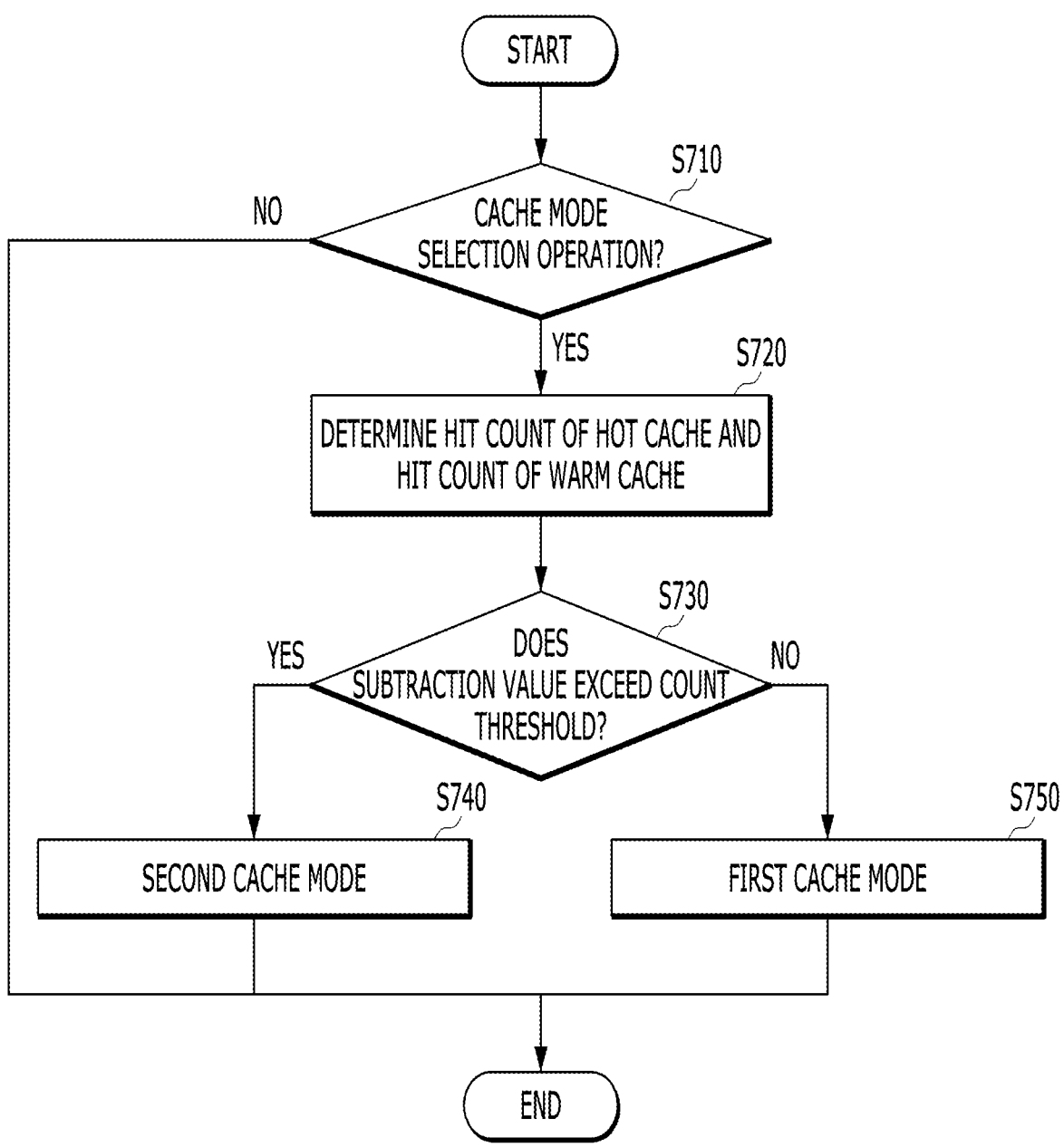
FIG. 7 is a flow diagram illustrating a method in which the cache mode manager of FIG. 1 performs the cache mode selection operation in accordance with an embodiment.

FIG. 7 is a flow diagram illustrating a method in which the cache mode manager 112 of FIG. 1 performs the cache mode selection operation in accordance with an embodiment.

Referring to FIG. 7, in step S710, the cache mode manager 112 may determine whether to perform the cache mode selection operation. For example, the cache mode manager 112 may determine to perform the cache mode selection operation when the number of cache misses or the cache miss rate of the current first level cache is higher than the miss threshold number or a threshold cache miss rate.

When the cache mode manager 112 determines not to perform the cache mode selection operation, the method ends. When the cache mode manager 112 determines to perform the cache mode selection operation, the procedure may proceed to step S720.

In step S720, the cache mode manager 112 may determine the hit count of the first cache 113 and the hit count of the second cache 114.

In step S730, the cache mode manager 112 may determine whether a subtraction value obtained by subtracting the hit count of the first cache 113 from the hit count of the second cache 114 exceeds the count threshold. When the subtraction value exceeds the count threshold, the method proceeds to step S740. When the subtraction value does not exceed the count threshold, the method proceeds to step S750.

In step S740, the cache mode manager 112 may select the second cache mode as the current cache mode. In the second cache mode, the second cache 114 may be used as the first level cache and the first cache 113 may be used as the second level cache.

In step S750, the cache mode manager 112 may select the first cache mode as the current cache mode. In the first cache mode, the first cache 113 may be used as the first level cache and the second cache 114 may be used as the second level cache.

Figure 8:
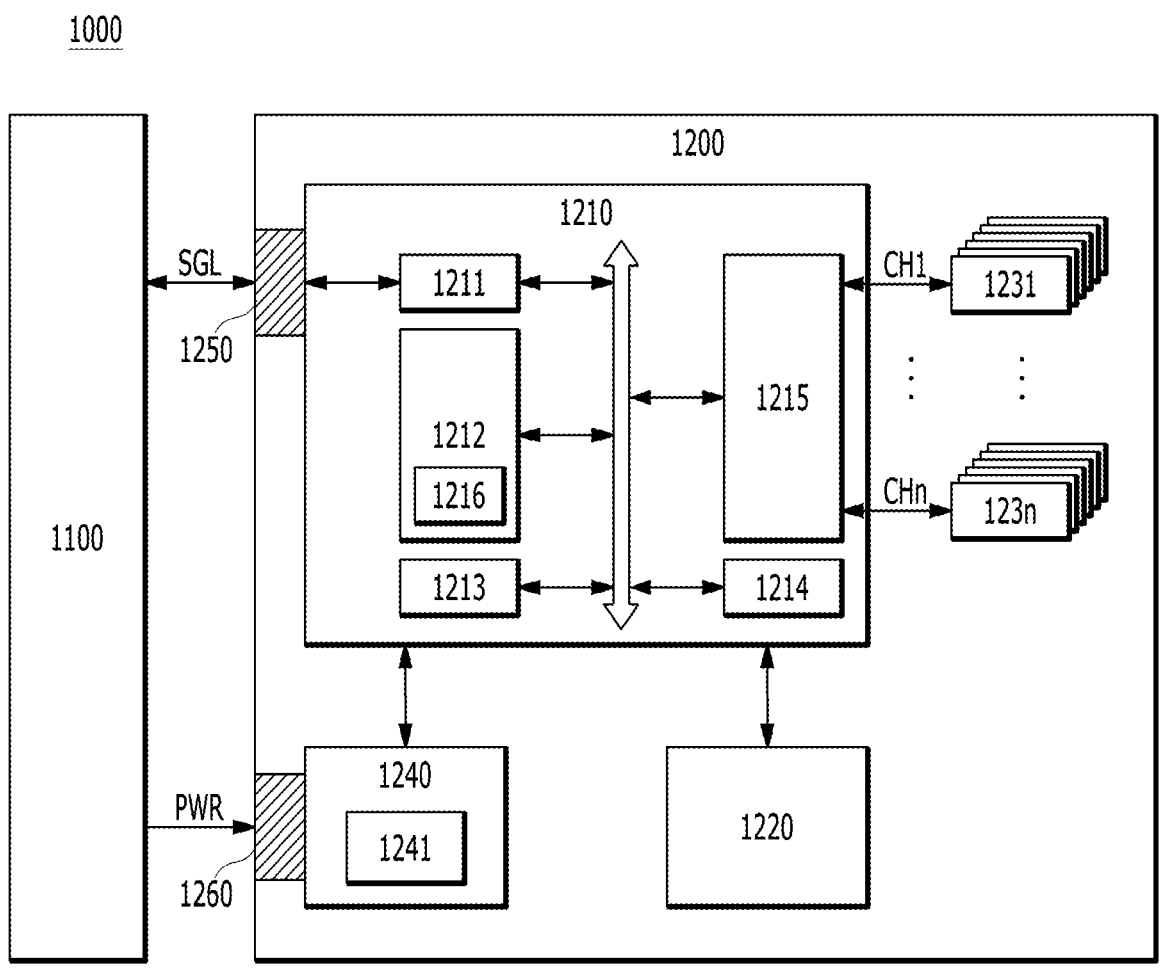
FIG. 8 is a diagram illustrating a data processing system including a solid state drive (SSD) in accordance with an embodiment.

FIG. 8 is a diagram illustrating a data processing system 1000 including a solid state drive (SSD) 1200 in accordance with an embodiment. Referring to FIG. 8, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, a memory interface unit 1215, and a cache mode manager 1216.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The control unit 1212 may be configured in the same manner as the control unit 111 shown in FIG. 1.

The random access memory 1213 may be used as a working memory for driving firmware or software. Furthermore, the random access memory 1213 may be used as a first cache of the SSD 1200. The random access memory 1213 may be configured in the same manner as the first cache 113 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

Meanwhile, the buffer memory device 1220 may be used as a second cache of the SSD 1200. The buffer memory device 1220 may be configured in the same manner as the second cache 114 shown in FIG. 1.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
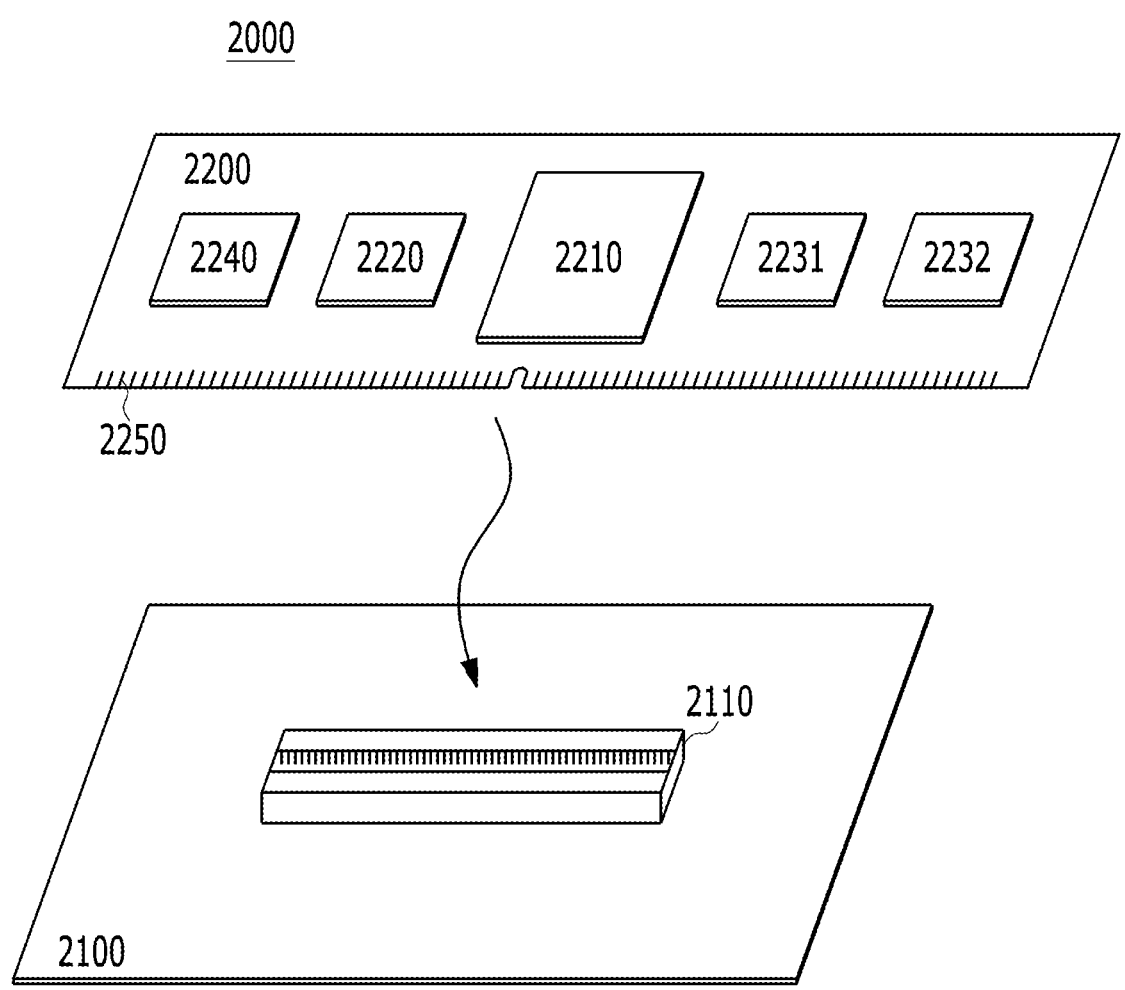
FIG. 9 is a diagram illustrating a data processing system including a memory system in accordance with an embodiment.

FIG. 9 is a diagram illustrating a data processing system 2000 including a memory system 2200 in accordance with an embodiment. Referring to FIG. 9, the data processing system 2000 may include a host device 2100 and the memory system 2200.

The host device 2100 may be configured in the form of a board, such as a printed circuit board. Although not shown, the host device 2100 may include internal function blocks for performing the functions of a host device.

The host device 2100 may include a connection terminal 2110 such as a socket, a slot, or a connector. The memory system 2200 may be mounted to the connection terminal 2110.

The memory system 2200 may be configured in the form of a board, such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 10:
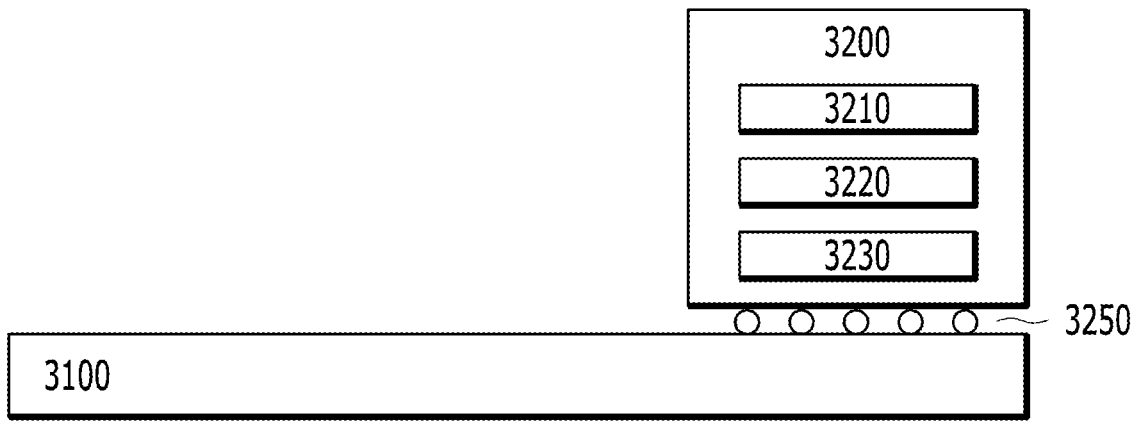
FIG. 10 is a diagram illustrating a data processing system including a memory system in accordance with an embodiment.

FIG. 10 is a diagram illustrating a data processing system 3000 including a memory system 3200 in accordance with an embodiment. Referring to FIG. 10, the data processing system 3000 may include a host device 3100 and the memory system 3200.

The host device 3100 may be configured in the form of a board, such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 8.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 11:
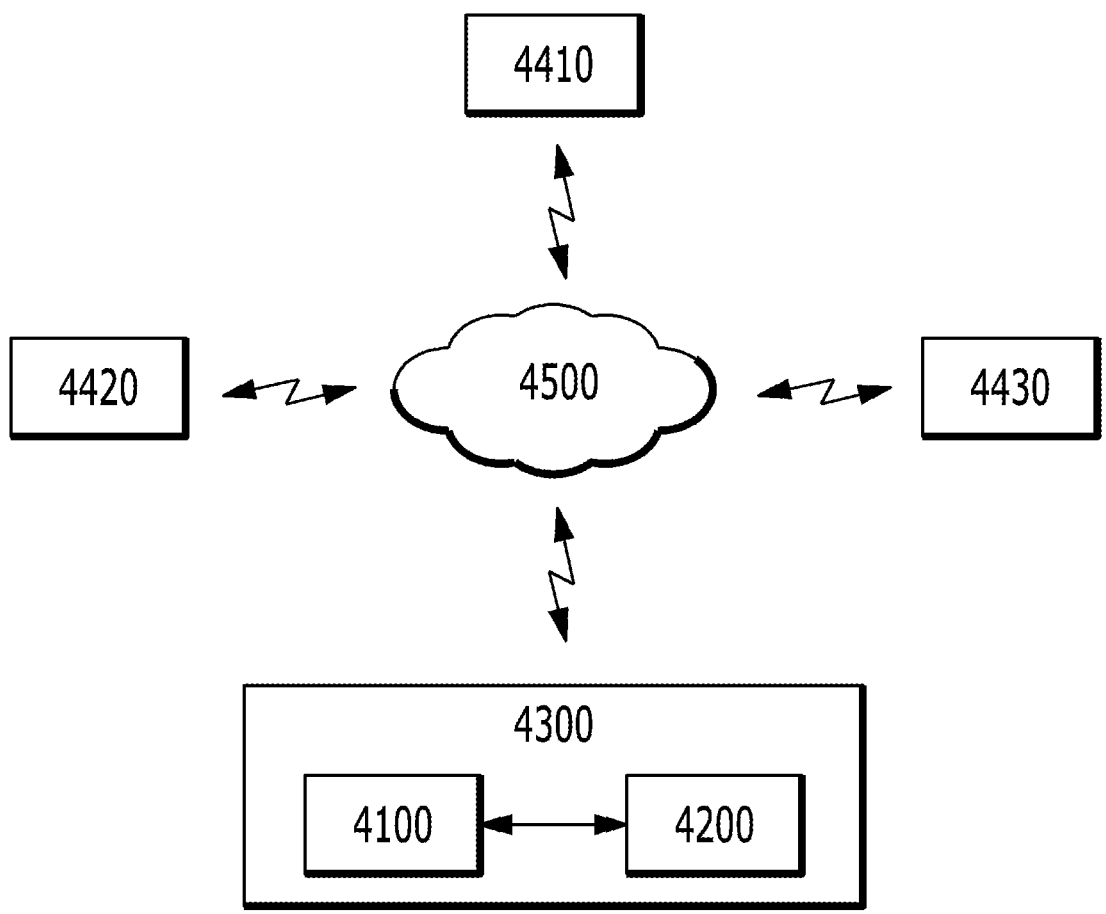
FIG. 11 is a diagram illustrating a network system including a memory system in accordance with an embodiment.

FIG. 11 is a diagram illustrating a network system 4000 including a memory system 4200 in accordance with an embodiment. Referring to FIG. 11, the network system 4000 may include a server system 4300 and a plurality of client systems 4410 to 4430, which are coupled through a network 4500.

The server system 4300 may service data in response to requests from the plurality of client systems 4410 to 4430. For example, the server system 4300 may store the data provided from the plurality of client systems 4410 to 4430. As another example, the server system 4300 may provide data to the plurality of client systems 4410 to 4430.

The server system 4300 may include a host device 4100 and the memory system 4200. The memory system 4200 may be configured by the memory system 10 shown in FIG. 1, the SSD 1200 shown in FIG. 8, the memory system 2200 shown in FIG. 9 or the memory system 3200 shown in FIG. 10.

Figure 12:
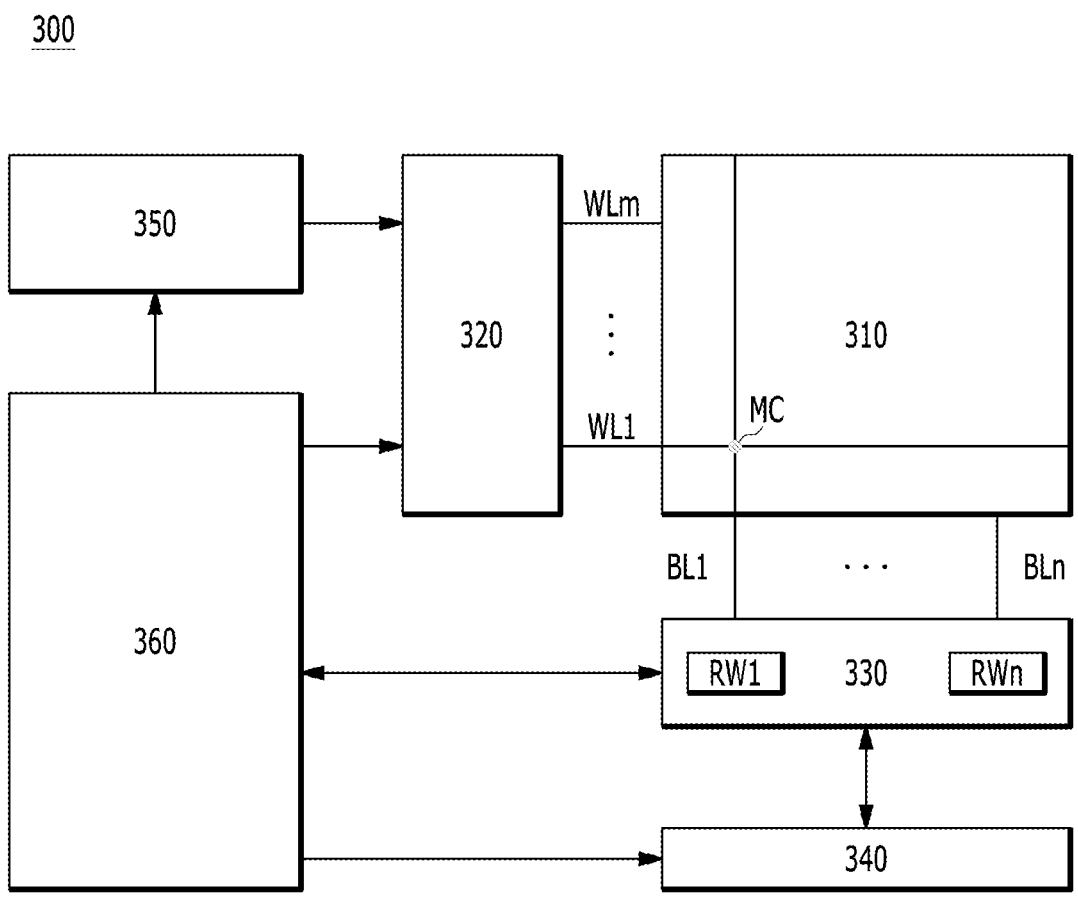
FIG. 12 is a block diagram illustrating a nonvolatile memory device included in a memory system in accordance with an embodiment.

FIG. 12 is a block diagram illustrating a nonvolatile memory device 300 included in a memory system in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

Because a person skilled in the art to which the present disclosure pertains may carry out the present disclosure in other specific forms without changing its technical spirit or essential features, it should be understood that the embodiments described above are illustrative in all respects and not limitative. The scope of the present disclosure is defined by the claims to be described below rather than the detailed description, and it should be understood that the meaning and scope of the claims and all modifications or modified forms derived from the equivalent concept thereof are included in the scope of the present disclosure.

What is claimed is:

1. A memory system comprising:
a first cache;
a second cache; and
a control unit configured to access the first cache as a first level cache in a first cache mode of operation of the memory system and access the second cache as the first level cache in a second cache mode of operation of the memory system,
wherein the control unit accesses the second cache as a second level cache in the first cache mode of operation and accesses the first cache as the second level cache in the second cache mode of operation.

2. The memory system according to claim 1, further comprising:
a cache mode manager configured to perform a cache mode selection operation that selects the first cache mode or the second cache mode as a current cache mode based on a hit count of the first cache and a hit count of the second cache.

3. The memory system according to claim 2, wherein, when a subtraction value obtained by subtracting the hit count of the first cache from the hit count of the second cache exceeds a threshold value, the cache mode manager selects the second cache mode, and when the subtraction value does not exceed the threshold value, the cache mode manager selects the first cache mode.

4. The memory system according to claim 2, wherein the cache mode manager determines whether to perform the cache mode selection operation based on a number of cache misses associated with a current first level cache.

5. The memory system according to claim 1, wherein the first cache operates at a faster access speed than the second cache.

6. The memory system according to claim 5, wherein the second cache has a larger memory capacity than the first cache.

7. The memory system according to claim 1, wherein, when a cache miss occurs in the second cache and a cache hit occurs in the first cache during the second cache mode of operation, the control unit accesses the first cache without recovering data from the first cache to the second cache.

8. The memory system according to claim 1, wherein the control unit evicts data from the second cache to the first cache according to a most recently used (MRU) policy when operating in the second cache mode.

9. The memory system according to claim 8, further comprising:
a storage medium,
wherein the control unit evicts data from the first cache to the storage medium according to a least recently used (LRU) policy when operating in the second cache mode.

10. A memory system comprising:
a first cache;
a second cache; and
a cache mode manager configured to select a first cache mode, which uses the first cache as a first level cache, or a second cache mode, which uses the second cache as the first level cache, as a current cache mode based on a hit count for the first cache and a hit count for the second cache.

11. The memory system according to claim 10, wherein the cache mode manager selects the first cache mode or the second cache mode as the current cache mode based on a subtraction value determined by subtracting the hit count of the first cache from the hit count of the second cache.

12. The memory system according to claim 11, wherein, when the subtraction value exceeds a threshold value, the cache mode manager selects the second cache mode, and when the subtraction value does not exceed the threshold value, the cache mode manager selects the first cache mode.

13. The memory system according to claim 10, wherein the cache mode manager selects the current cache mode based on the hit count for the first cache and the hit count for the second cache in response to a number of cache misses for a current first level cache exceeding a threshold cache miss number.

14. The memory system according to claim 10, wherein the first cache operates at a faster access speed than the second cache.

15. The memory system according to claim 14, wherein the second cache has a larger memory capacity than the first cache.

16. The memory system according to claim 10, wherein the first cache mode uses the second cache as a second level cache, and the second cache mode uses the first cache as the second level cache.

17. The memory system according to claim 10, further comprising:
a control unit configured to evict data from the second cache to the first cache according to a most recently used (MRU) policy in the second cache mode.

18. The memory system according to claim 17, further comprising:
a storage medium,
wherein the control unit evicts data from the first cache to the storage medium according to a least recently used (LRU) policy in the second cache mode.

19. A memory system comprising:
a first cache;
a second cache;
a control unit configured to:
evict data from the first cache to the second cache according to a first cache eviction policy when the memory system operates in a first cache mode; and evict data from the second cache to the first cache according to a second cache eviction policy when the memory system operates in a second cache mode, and a cache mode manager configured to perform a cache mode selection operation that selects the first cache mode or the second cache mode as a current cache mode based on a hit count of the first cache and a hit count of the second cache.

\* \* \* \* \*